United States Patent
Wolfe

[11] Patent Number: 6,009,981
[45] Date of Patent: Jan. 4, 2000

[54] SHAFT LOCKING OR BRAKING DEVICE FOR LINEAR MOTION SYSTEMS

[76] Inventor: William V. Wolfe, 145 Birch La., San Jose, Calif. 95127

[21] Appl. No.: 08/931,452

[22] Filed: Sep. 17, 1997

Related U.S. Application Data

[60] Provisional application No. 60/026,399, Sep. 17, 1996.

[51] Int. Cl.[7] .................................................. B65H 59/10
[52] U.S. Cl. .......................................................... 188/267
[58] Field of Search ............................ 188/67; 92/23, 92/24

[56] References Cited

U.S. PATENT DOCUMENTS

| | | | |
|---|---|---|---|
| 2,055,942 | 9/1936 | Novak | 188/67 |
| 2,207,130 | 7/1940 | Otis | 188/67 |
| 4,469,201 | 9/1984 | Rastetter et al. | 188/67 |
| 4,475,607 | 10/1984 | Haney | 188/67 |
| 4,564,088 | 1/1986 | Takahashi et al. | 188/67 |
| 4,577,732 | 3/1986 | Gottling | 188/67 |
| 4,586,425 | 5/1986 | Redman et al. | 91/45 |
| 4,601,232 | 7/1986 | Troxell, Jr. | 92/24 |
| 4,791,855 | 12/1988 | Matsui | 188/67 |
| 4,823,919 | 4/1989 | Hayatdavoudi | 188/67 |
| 4,827,293 | 5/1989 | Niemeyer, III | 346/139 R |
| 4,844,677 | 7/1989 | Schwartzman | 411/512 |
| 4,989,909 | 2/1991 | Bouligny, Jr. et al. | 188/67 |
| 5,111,913 | 5/1992 | Granbom | 188/67 |
| 5,115,889 | 5/1992 | Fortmann et al. | 188/67 |
| 5,184,700 | 2/1993 | Mainardi | 188/67 |
| 5,219,045 | 6/1993 | Porter et al. | 188/67 |
| 5,261,509 | 11/1993 | Cattini | 188/67 |
| 5,299,787 | 4/1994 | Svensson | 267/64.12 |
| 5,301,569 | 4/1994 | Droulon | 74/531 |
| 5,351,789 | 10/1994 | Tochihara et al. | 188/67 |
| 5,441,129 | 8/1995 | Porter et al. | 188/67 |

*Primary Examiner*—Robert J. Oberleitner
*Assistant Examiner*—Robert A. Siconolfi
*Attorney, Agent, or Firm*—Gregory Scott Smith; Carol D. Titus; James J. Leary

[57] ABSTRACT

A shaft locking or brake device for use with a guide shaft or rail of a linear motion system includes a pair of clamping members enclosed within a housing and an actuator. Referring to FIG. 1, the clamping members (26, 28) have specially contoured cut-outs (38, 40) which surround an axially sliding shaft or a rail (22) of a linear motion system. The clamping members (26, 28) carry pivot pins (30, 32) which serve as a fulcrum against the interior surface of the housing (24). A lever arm extends (34, 36) from the lower end of each clamping member (26, 28) and engages two links (52, 58) of a toggle mechanism which are pivotally connected by a circular toggle disk (54). When the shaft locking device is actuated by a handle (58) which extends from the housing, the toggle mechanism pivots the lever arms outward (34, 36), which in turn causes the clamping members (26, 28) to pivot around their respective pivot pins (30, 32) causing the clamping members (26, 28) to move inward and frictionally engage the shaft (22).

33 Claims, 7 Drawing Sheets

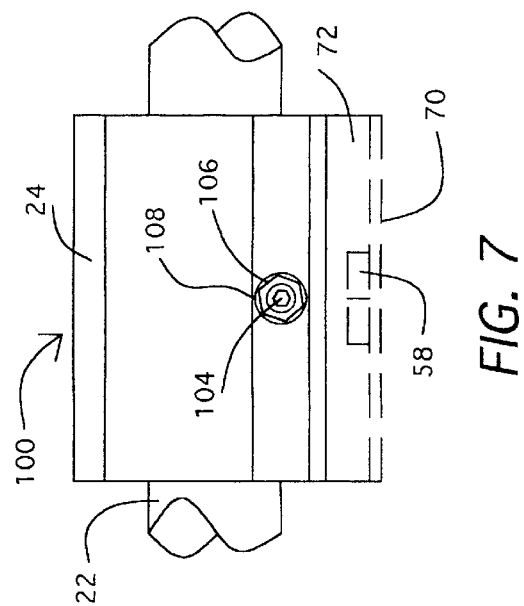
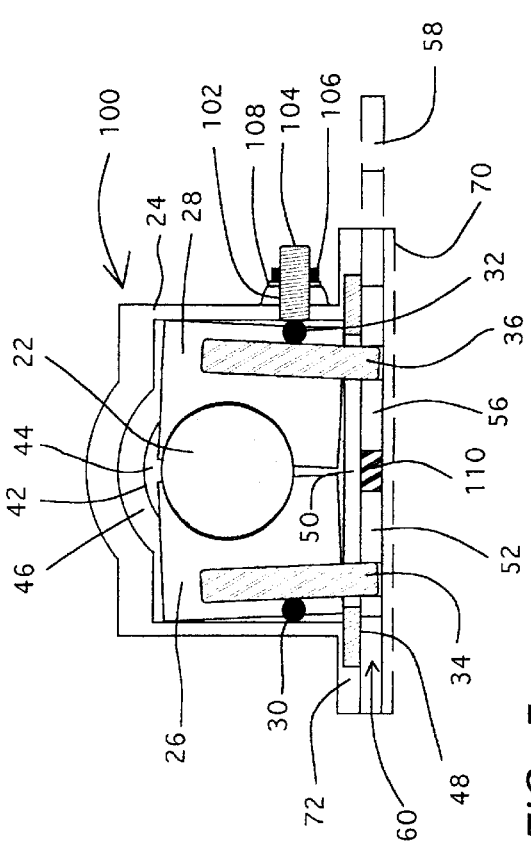
FIG. 7
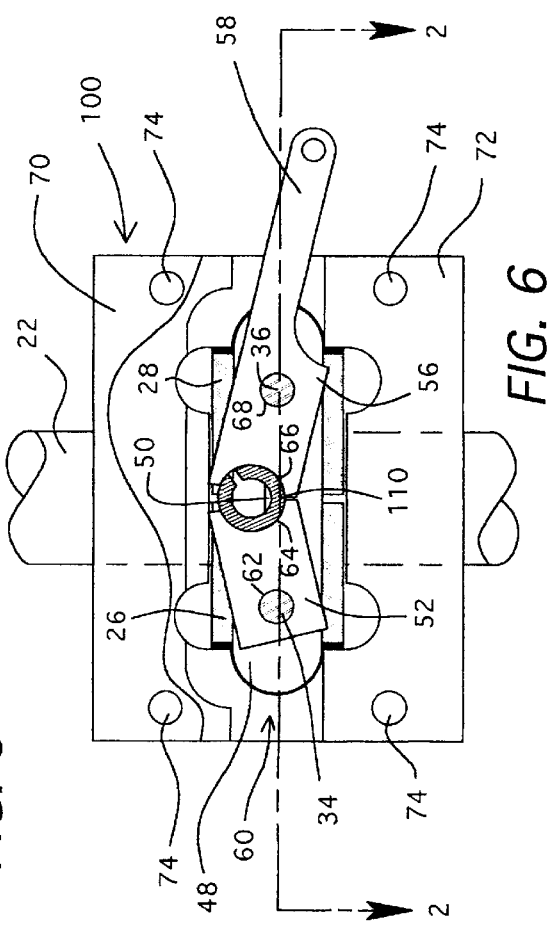
FIG. 5
FIG. 6

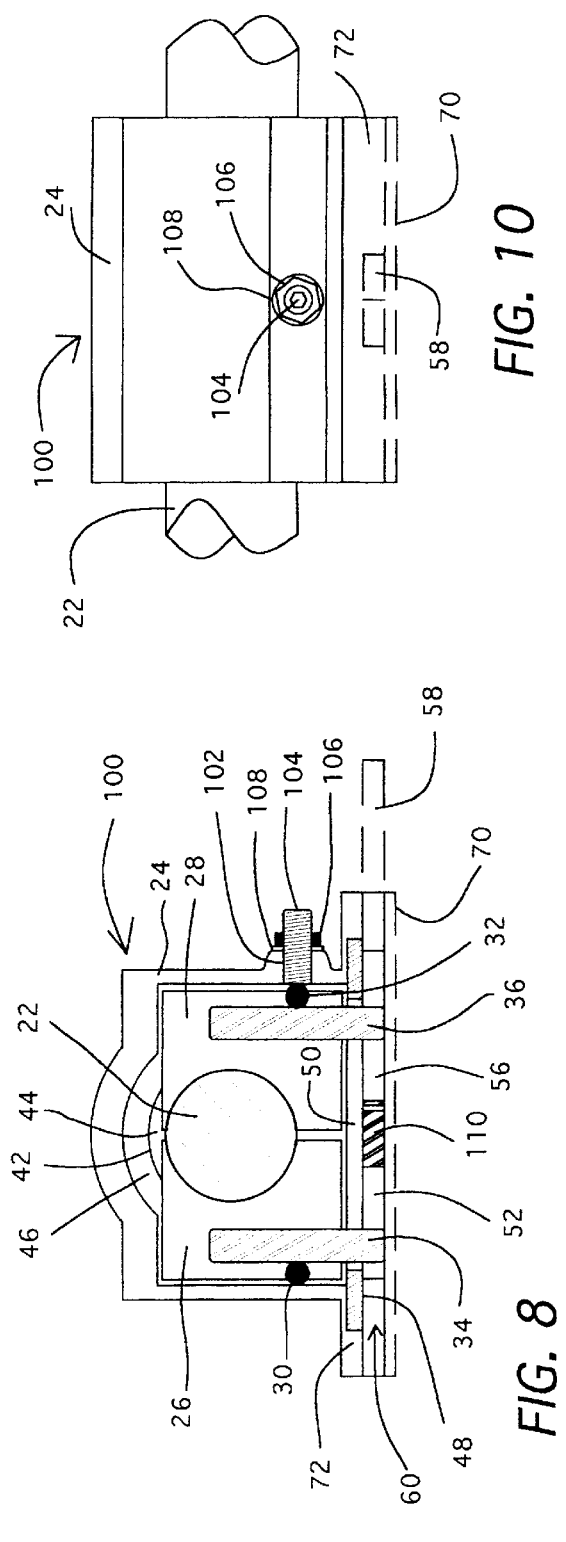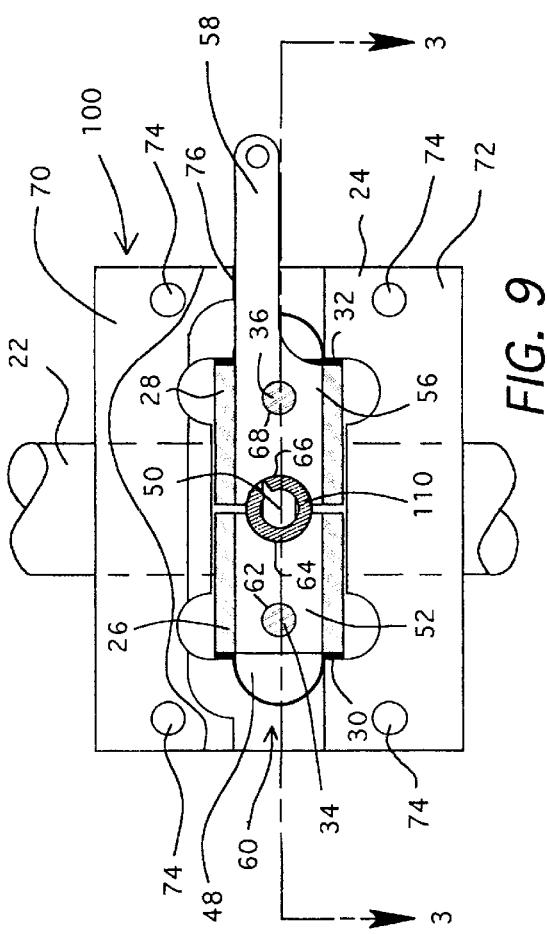

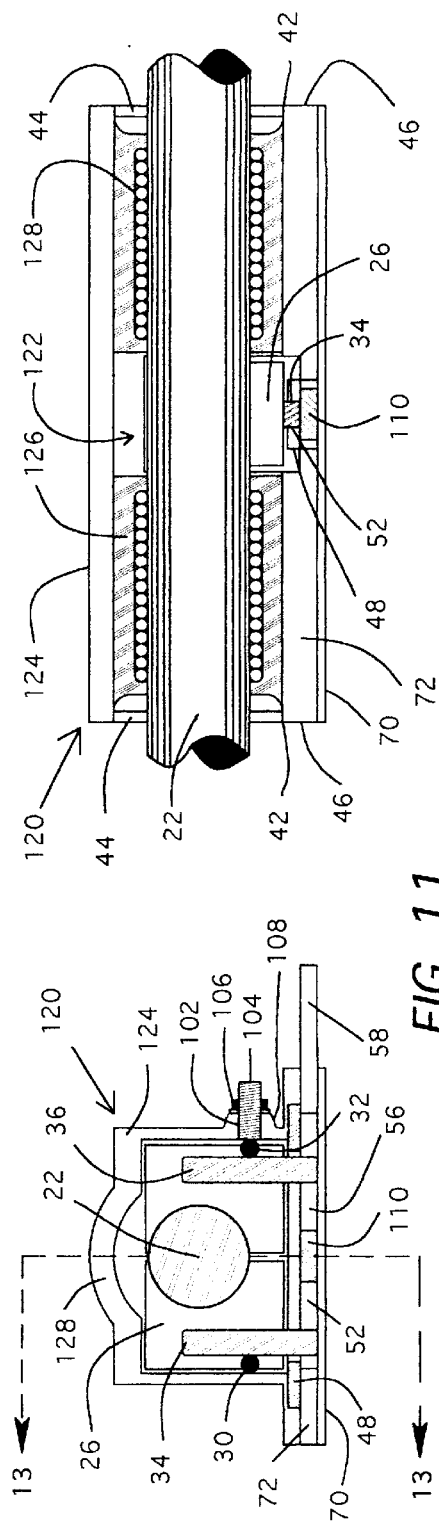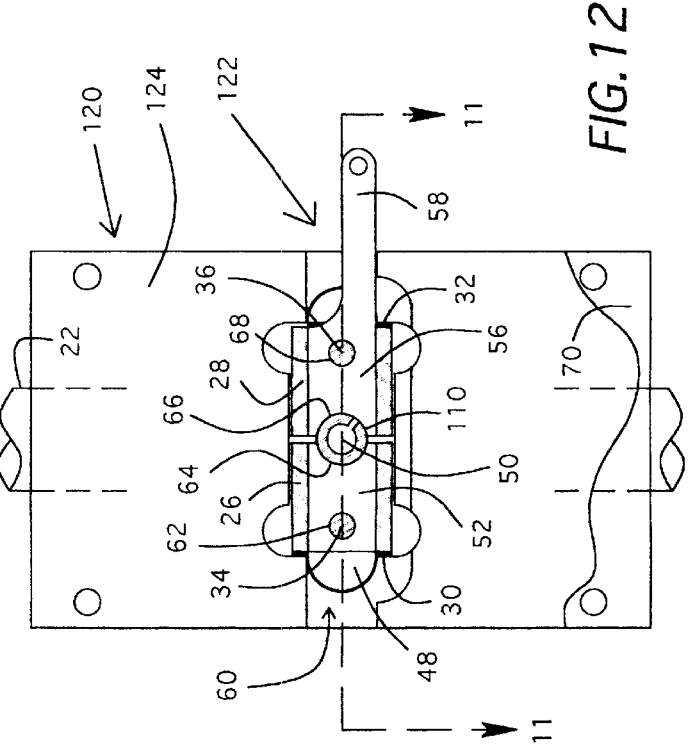

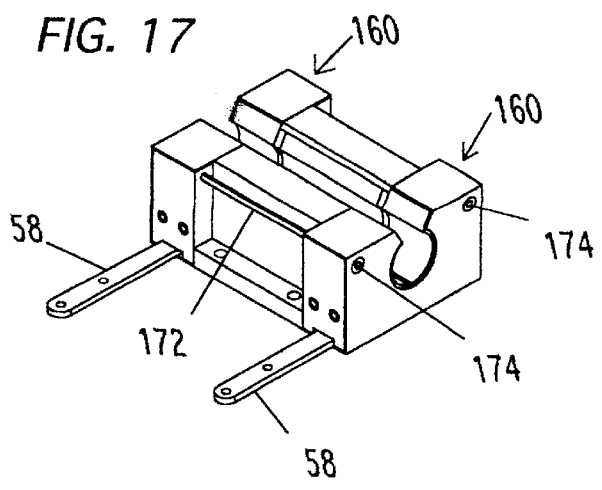
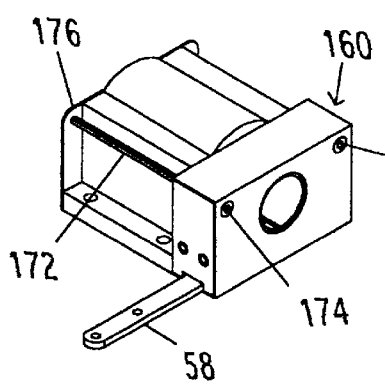
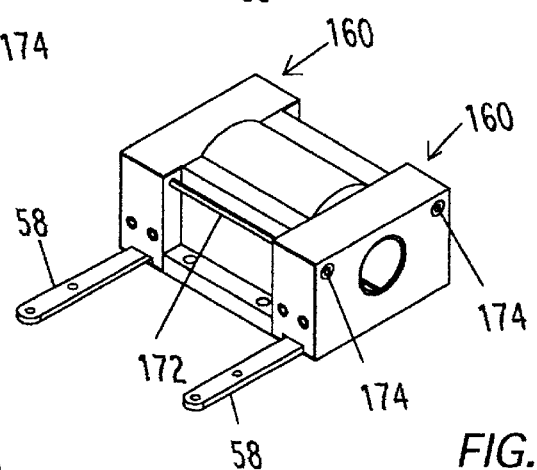
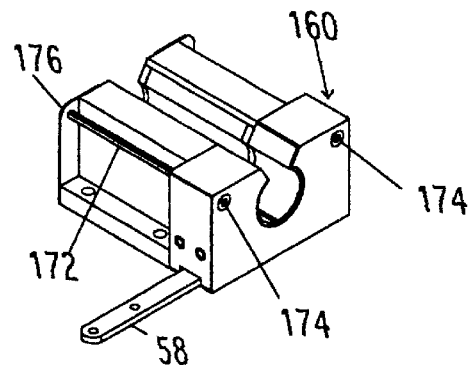
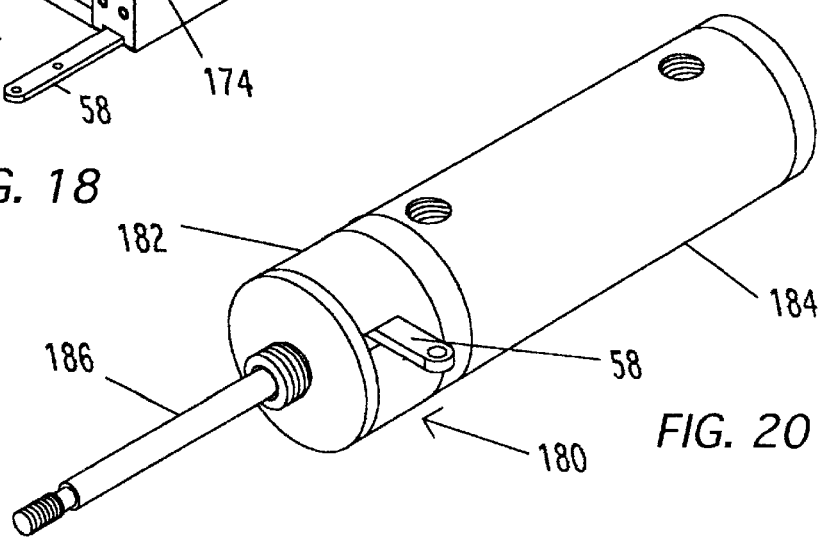

SHAFT LOCKING OR BRAKING DEVICE FOR LINEAR MOTION SYSTEMS

CROSS REFERENCE TO RELATED APPLICATIONS

This application claims the benefit of the provisional patent application of William V. Wolfe, for a Shaft Locking Device For Linear Motion Systems, Ser. No. 60/026,399 filed on Sep. 17, 1996, which is hereby incorporated by reference in its entirety.

FIELD OF THE INVENTION

The present invention relates to braking or locking devices for shaft or rail-type linear motion systems. The invention has application as a brake, safety lock, or positioning device for various linear motion systems, including sliding shaft systems, pressure cylinders such as pneumatic and hydraulic cylinders, rodless cylinders and linear actuators wherein a shaft moves linearly in relation to a stationary block, or wherein a carriage moves linearly along a shaft or rail.

DESCRIPTION OF THE PRIOR ART

Generally, linear motion systems consist of one or more tracks, guide rails, shafts, or rods on which a carriage or other devices are moved. The movement may be accomplished by any number of means including electrical, hydraulic, and pneumatic means.

There are many uses for locking, braking, or position holding devices in various linear motion systems. For example, it may be desirable to lock a linear motion system in the interest of personnel safety in the event of an unexpected power failure or other failure of a linear motion system.

Often such linear motion systems require a means for locking the carriage at a precise position so that outside forces acting on the carriage will not move the carriage from the desired position. It is equally important that the operation of the locking mechanism itself does not cause a change in position.

Current means for locking a carriage in position on a guide rail include cam devices which act on a guide rail or on a piston rod moving the carriage. An example of such a device in shown in U.S. Pat. No. 4,791,855, issued to Matsui, for a cylinder locking device. The disclosed device uses two semi-cylindrical cams disposed within a housing. The cams have eccentric outer and inner circumferential portions, a shaft which extends through the housing and is slideably received between the cams within the smaller semi-cylindrical portions. The device is locked by axially rotating the cams in opposite directions. The problem with the device disclosed in Matsui is that the operation of the cams causes the abutment area of the cams to move slightly perpendicularly to the longitudinal axis of the guide rail to a position approximately parallel to the axis of the guide rail, thereby causing displacement of the position of the carriage.

Therefore, it is desirable to provide a device used for locking, braking, or positioning devices in various linear motion systems, including sliding shaft systems, pneumatic and hydraulic cylinders, rodless cylinders and linear actuators, wherein a shaft moves linearly in relation to a stationary block or wherein a carriage moves linearly along a shaft or rail, which overcomes the disadvantages discussed above.

It is also desirable to provide a device which is structurally simple, compact, capable of highly accurate positioning, and capable of providing high braking forces relative to the force required to actuate the device.

It is further desirable to provide a device which can be used on both guide shaft and rail linear motion systems, integrated with linear bearings, or coupled to or around such bearings. It is particularly desirable to provide a device which can be coupled to or around a linear bearing without directly modifying the linear bearing in any way.

SUMMARY OF THE INVENTION

Accordingly, the present invention takes the form of a device for use as a brake, safety lock, or positioning device for various linear motion systems, including sliding shaft systems, pneumatic and hydraulic cylinders, rodless cylinders and linear actuators wherein a shaft moves linearly in relation to a stationary block, or wherein a carriage moves linearly along a shaft or rail.

The shaft locking device can be used as a conventional brake, as an emergency braking device or safety lock or as a positional locking device for a variety of linear motion systems. The shaft locking device has a pair of clamping members enclosed within a housing. The clamping members have specially contoured cut-outs which surround an axially sliding shaft or a rail of a linear motion system. The clamping members carry pivot pins which serve as a fulcrum against the interior surface of the housing. A lever arm extends from the lower end of each clamping member and engages two links of a toggle mechanism which are pivotally connected by a circular toggle disk. When the shaft locking device is actuated by a handle which extends from the housing, the toggle mechanism pivots the lever arms outward, which in turn causes the clamping members to pivot around their respective pivot pins causing the clamping members to move inward and frictionally engage the shaft. In this locked position, the shaft is hindered or prevented from sliding axially or rotating with respect to the shaft locking device. The toggle mechanism exponentially increases the mechanical advantage of the shaft locking device to provide a greatly increased clamping force on the shaft from a relatively low actuation force. The toggle mechanism is self-locking so that the shaft locking device will remain locked even if there is a loss of pneumatic, hydraulic or electrical power to the linear motion system. The toggle mechanism has a very low profile which allows the shaft locking device to be made with the same dimensions and profile as a linear bearing for a linear motion system.

In addition, a second embodiment of the shaft locking device provides additional features for adjustment of the clamping force on the shaft of the linear motion system and a third embodiment of the shaft locking device illustrates how the shaft locking device can be integrated with a linear bearing for a linear motion system. A fourth embodiment shows a shaft locking device adapted for use with a supported-rail linear guidance system and also shows a simplified construction of the shaft locking device. A fifth embodiment shows a shaft locking device having an open end similar to the adaptation shown in the fourth embodiment, but with the housing partially covering the open end. A sixth embodiment shows the use of one or more devices mounted securely around a linear bearing without directly modifying the bearing in any way. A seventh embodiment shows the device adapted for use on a pneumatic or hydraulic linear motion system. An eighth embodiment shows a shaft locking device which has been modified to be coupled to a plurality of parallel shafts or rails.

Other objects and advantages of the shaft locking device of the present invention will no doubt occur to those skilled in the art from reading and understanding the following detailed description along with the accompanying drawings.

BRIEF DESCRIPTION OF THE DRAWINGS

FIG. 5 shows a lateral cross section of a second embodiment of the shaft locking device for linear motion systems in the released position.

FIG. 6 shows a cut-away bottom view of the shaft locking device of FIG. 5 in the released position.

FIG. 7 shows a partially cut-away side view of the shaft locking device of FIG. 5.

FIG. 8 shows a lateral cross section of the shaft locking device of FIG. 5 in the locked position.

FIG. 9 shows a cut-away bottom view of the shaft locking device of FIG. 5 in the locked position.

FIG. 10 shows a partially cut-away side view of the shaft locking device of FIG. 5.

FIG. 11 shows a lateral cross section of a third embodiment of the invention having the shaft locking device integrated with a linear bearing for a linear motion system.

FIG. 12 shows a cut-away bottom view of the shaft locking device of FIG. 11.

FIG. 13 shows a longitudinal cross section of the shaft locking device of FIG. 11.

FIG. 16 shows a perspective view of the device of the present invention, having a partially open housing, adapted to be securely coupled to a linear bearing without directly modifying the bearing.

FIG. 17 shows a perspective view of two devices of the present invention, having a partially open housings, adapted to be securely coupled to a linear bearing without directly modifying the bearing.

FIG. 18 shows a perspective view of the closed housing embodiment of the present invention securely coupled to a linear bearing without directly modifying the bearing.

FIG. 19 shows a perspective view of two closed housing embodiments of the present invention securely coupled to a linear bearing without directly modifying the bearing.

FIG. 20 shows a perspective view of the invention adapted for use on a pressure cylinder.

DETAILED DESCRIPTION OF THE INVENTION

The preferred embodiments of the braking or locking devices for shaft or rail-type linear motion systems, generally referred to as shaft locking device 20, as described herein contemplates a preferred orientation for use. However, other orientations are possible. References to up, down, above, below, vertical, horizontal, etc. should be understood to refer generally to the relative positions of the elements of the illustrated device, which could be otherwise oriented or positioned.

Figure 1:
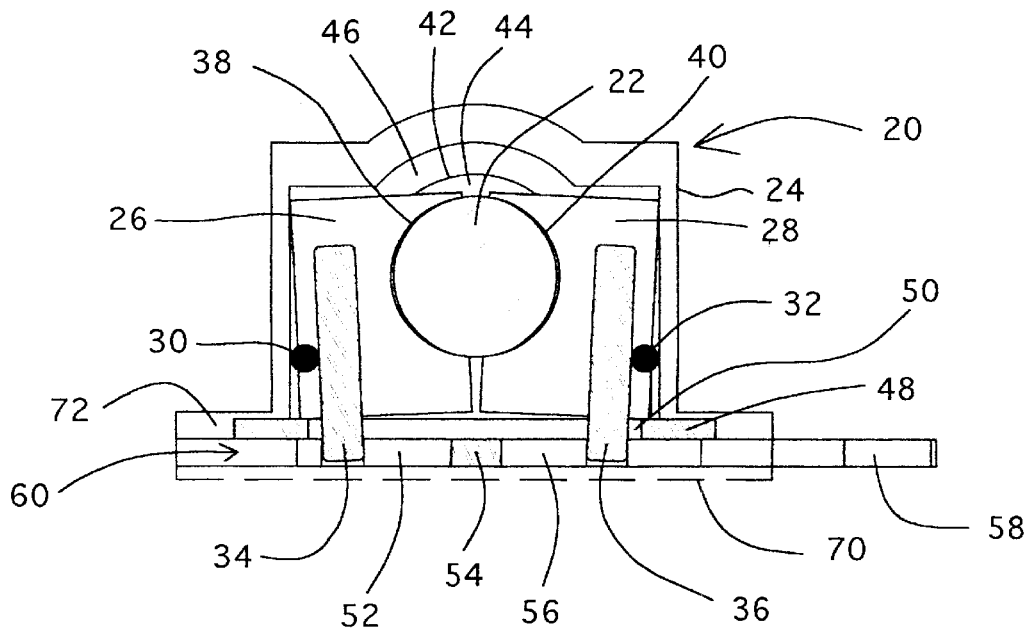
FIG. 1 shows a lateral cross section of a first embodiment of the shaft locking device for linear motion systems in the released position.

FIGS. 1 through 4 illustrate a first embodiment of the shaft locking device 20 of the present invention which is used in connection with a guide shaft 22 of a linear motion system. The shaft locking device 20 is shown in a released position in FIGS. 1 and 2 and in a locked position in FIGS. 3 and 4. Turning first to FIG. 1, the shaft locking device 20 is shown in a lateral cross section. The shaft locking device 20 has a housing 24 which is preferably made of aluminum or other suitable rigid and lightweight material. In one preferred embodiment of the invention, the housing 24 is made with the same dimensions and profile as a linear bearing for a linear motion system, also known as a pillow block. This allows the shaft locking device 20 to be easily integrated into the linear motion system using the same mounting holes and hardware as other system components. The shaft 22 passes through the housing 24 in an axially sliding manner. The endwalls 46 of the housing 24 are perforated by holes 42 to allow the shaft 22 to pass through the housing 24. In a preferred embodiment, a flexible annular seal 44, seen in FIG. 1, made of an elastomeric material, plastic or rubber seals each of the holes 42 between the housing 24 and the shaft 22 to prevent dirt and debris from entering the housing 24.

Within the housing 24 are a pair of clamping members 26, 28. The clamping members 26, 28 each have a recess, which in the embodiment shown comprise an approximately semicircular cut-out 38, 40 which is shaped to conform to the exterior of the shaft 22. In alternate embodiments, the recess can be any shape required to accommodate the shape of the shaft or rail including square and splined. In the illustrative embodiment shown, the entire clamping members 26, 28 are made of a friction material which will not damage the shaft or rail. In alternate embodiments, a separate brake lining may be used in the semicircular cut-outs 38,40. Suitable friction materials for the clamping members 26, 28 or linings thereon are preferably porous bronze, however any acceptable material may be used including, but not limited to, brake lining material, such as XOP lining material, available from Friction Materials, Inc., G10 fiberglass loaded epoxy, clutch material such as metal reinforced asbestos, or any of various plastics with a suitable friction coefficient, for example Delrin Acetal which would be suitable for use within a clean room environment because of the low particulate generation. Each of the clamping members 26, 28 has a pivot pin 30, 32 located on the side of the clamping member 26, 28 opposite the semicircular cut-out 38, 40. The pivot pin 30, 32 may be made of a small diameter steel dowel pin or the like which is adhesively bonded into a hole drilled in the clamping member 26, 28 slightly below the position of the semicircular cut-out 38, 40. The pivot pin 30, 32 protrudes slightly from the side of the clamping member 26, 28 and contacts the interior of the housing 24 to provide a pivot point for the rotation of the clamping member 26, 28. Each of the clamping members 26, 28 has a lever arm 34, 36 which extends from the bottom end of the clamping member 26, 28. The lever arm 34, 36 may be made of a steel dowel pin or the like which is received within a hole drilled into the bottom surface of the clamping member 26, 28. In alternate embodiments, lever arms 34, 36 may be adhesively bonded or otherwise affixed within holes drilled in the bottom surface of the clamping members 26, 28. The lever arms 34, 36 extend through an elongated slot 50 within a guide strip 48. The elongated slot 50 in the guide strip 48 provides a sliding clearance for the lever arms 34, 36 and so acts to keep the clamping members 26, 28 in alignment by constraining the lever arms 34, 36 to a linear movement within the elongated slot 50. Guide strip 48 is preferably made of brass. The lower ends of the lever arms 34, 36 engage the links 52, 56 of a toggle mechanism 60.

Figure 2:
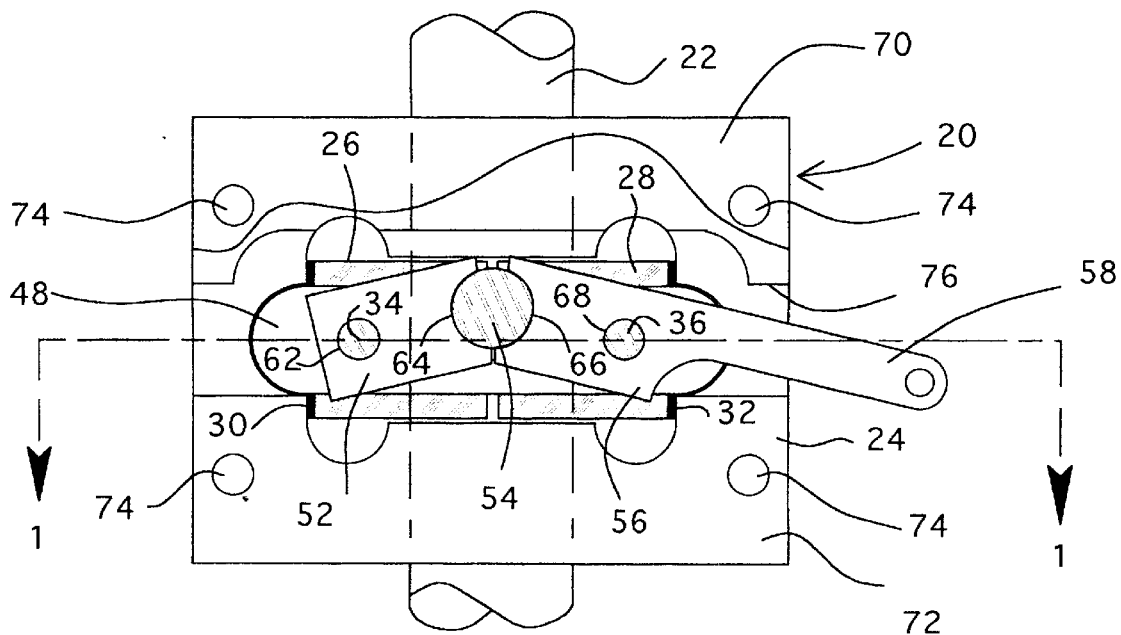
FIG. 2 shows a cut-away bottom view of the shaft locking device of FIG. 1 in the released position.

The toggle mechanism 60 can best be seen in the cut-away bottom view of the shaft locking device 20 in FIG. 2. The end of the first lever arm 34 engages a hole 62 drilled through one end of the first toggle link 52. There is a crescent-shaped cut-out 64, which is somewhat less than a full semicircle, on the end of the first toggle link 52 opposite the hole 62. The end of the second lever arm 36 engages a hole 68 drilled through one end of the second toggle link 56. There is crescent shaped cut-out 66, which is also somewhat less than a full semicircle, on the end of the second toggle link 56 opposite the hole 68. An elongated handle 58 extends from the end of the second toggle link 56 opposite the crescent-shaped cut-out 66. The elongated handle 58 extends outside of the housing 24. A circular toggle disk 54 is positioned between the two crescent-shaped cut-outs 64, 66 so that it pivotally connects the first toggle link 52 and the second toggle link 56. A bottom cover 70, shown partially cut away in FIG. 2, is fastened to a flange 72 on the bottom of the housing 24 through bolt holes 74 to enclose the clamping members 26, 28 and the toggle mechanism 60 within the housing 24.

The shaft locking device 20 is shown in a released position in FIGS. 1 and 2. The elongated handle 58 which extends outside of the housing 24 is pivoted downward to rotate the second toggle link 56 clockwise. This, in turn, rotates the first toggle link 52, which is pivotally connected to the second toggle link 56 through the toggle disk 54, counterclockwise. In this position, the lever arm aperture 62 in the first toggle link 52 and the lever arm aperture 68 in the second toggle link 56 move inward toward one another, pivoting the first lever arm 34 and the second lever arm 36 inward as well. Pivoting the first lever arm 34 and the second lever arm 36 inward causes the clamping members 26, 28 to pivot around the pivot pins 30, 32 so that the semicircular cut-outs 38, 40 move outward to disengage the shaft 22. In this released position, the shaft 22 is free to slide axially through the shaft locking device 20.

Figure 3:
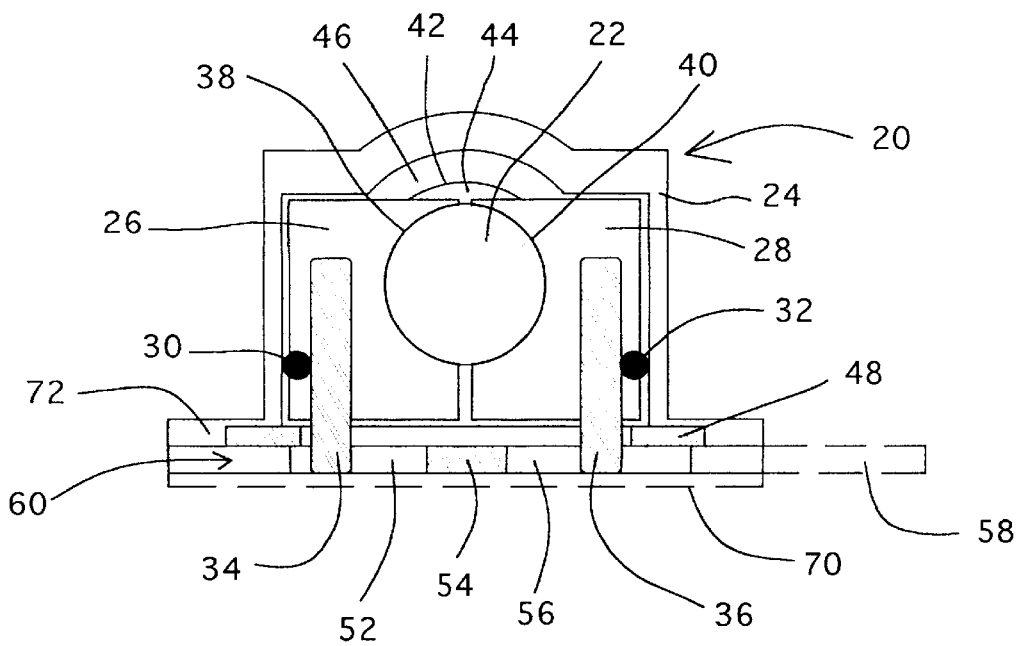
FIG. 3 shows a lateral cross section of the shaft locking device of FIG. 1 in the locked position.
Figure 4:
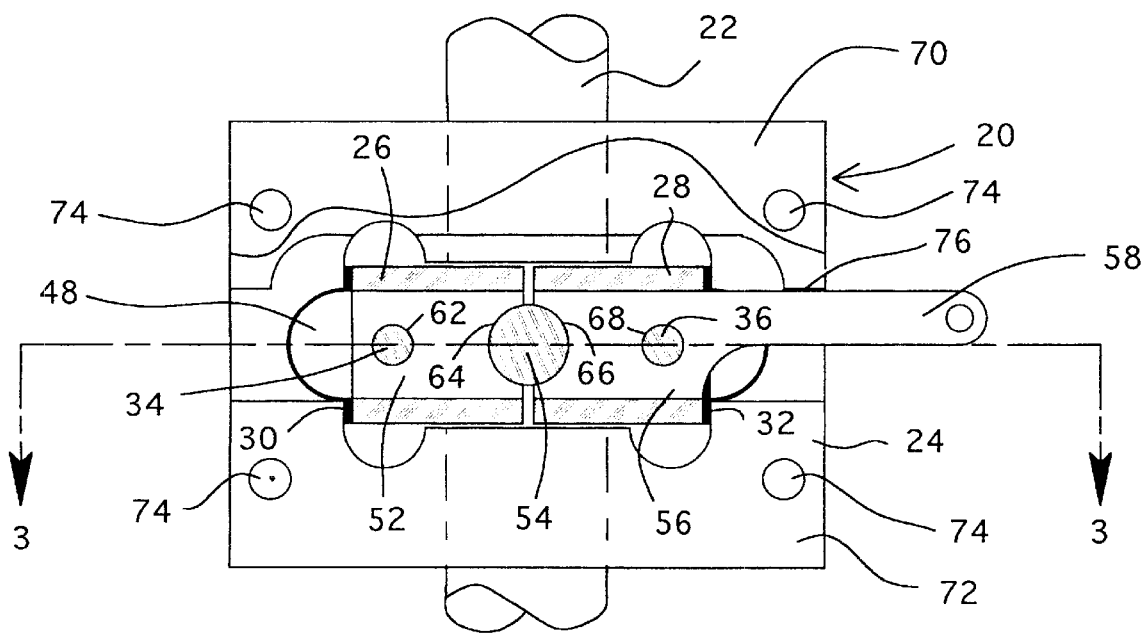
FIG. 4 shows a cut-away bottom view of the shaft locking device of FIG. 1 in the locked position.

The shaft locking device 20 of FIGS. 1 and 2 is shown in a locked position in FIGS. 3 and 4. To lock the shaft locking device 20, the elongated handle 58 is pivoted upward until it contacts a shoulder 76 machined into the flange 72 on the bottom of the housing 24. This rotates the second toggle link 56 counterclockwise, which in turn rotates the first toggle link 52 clockwise through the toggle disk 54. In this position, the hole 62 in the first toggle link 52 and the hole 68 in the second toggle link 56 move outward away from one another, pivoting the first lever arm 34 and the second lever arm 36 outward as well. Pivoting the first lever arm 34 and the second lever arm 36 outward causes the clamping members 26, 28 to pivot around the pivot pins 30, 32 so that the semicircular cut-outs 38, 40 move inward to frictionally engage the shaft 22. In this locked position, the shaft 22 is prevented from sliding axially or rotating with respect to the shaft locking device 20. The toggle mechanism 60 exponentially increases the mechanical advantage of the shaft locking device 20 as the first toggle link 52 and the second toggle link 56 become linearly aligned with one another. This provides a greatly increased clamping force on the shaft 22 from a relatively low actuation force on the handle 58. Optionally, shims may be provided between the pivot pins 30, 32 and the housing 24 for adjusting the clearance between the clamping members 26, 28 and the shaft 22 in order to adjust the clamping force of the shaft locking device 20 or to compensate for wear of the clamping members 26, 28. Preferably, the shoulder 76 on the housing 24 is positioned so that the handle 58 of the toggle mechanism 60 moves over center slightly beyond the point where the first toggle link 52 and the second toggle link 56 are linearly aligned with one another so that the shaft locking device 20 becomes self-locking in the locked position. This self-locking feature of the shaft locking device 20 provides additional safety for pneumatically, hydraulically or electrically actuated brakes which might otherwise release if there was a loss of power to the system.

FIGS. 5 through 10 illustrate a second embodiment of the shaft locking device 100 of the present invention that provides additional features for adjustment of the clamping force on the shaft 22 of the linear motion system. The shaft locking device 100 is shown in a released position in FIGS. 5, 6 and 7 and in a locked position in FIGS. 8, 9 and 10. The same general description given for the embodiment of FIGS. 1 through 4 also applies to this embodiment of the shaft locking device 100, therefore similar parts have been given the same reference numbers, with the following modifications. Looking first to the lateral cross section of the shaft locking device 100 shown in FIGS. 5 and 8, the housing 24 has been modified by placing a threaded adjustment hole 102 through the side wall of the housing 24 at the level of the pivot pin 32 on the second clamping member 28. A set screw 104 is threaded into the adjustment hole 102 so that it bears against the pivot pin 32. Screwing the set screw 104 into the housing 24 decreases the clearance between the clamping members 26, 28 and the shaft 22 and increases the clamping force of the shaft locking device 20. Unscrewing the set screw 104 increases the clearance between the clamping members 26, 28 and the shaft 22 and decreases the clamping force of the shaft locking device 20. The set screw 104 can be iteratively adjusted so that the shaft locking device 100 provides the desired clamping force when it is in the locked position as shown in FIGS. 8, 9 and 10. A washer 108 and a lock nut 106 are provided for locking the set screw 104 in the selected position.

As can be seen in the cut-away bottom views of the shaft locking device 100 shown in FIGS. 6 and 9, the circular toggle disk 54 has been replaced with a compliant toggle ring 110. The compliant toggle ring 110 is made of spring steel or a similar material by bending spring wire into a ring or by machining. The compliant toggle ring 110 compresses slightly when the toggle mechanism 60 is in the locked position as in FIG. 9. The compression of the compliant toggle ring 110 compensates for small variations in machining tolerances in the toggle links 52, 56 and also compensates for wear of the clamping members 26, 28 or other components and small dimensional variations in the diameter of the shaft 22. This allows more economical fabrication of the other component parts and provides relatively constant clamping force without the need for frequent adjustments due to wear.

FIGS. 11 through 13 illustrate a third embodiment of the shaft locking device 120 of the present invention which is a modified version of the embodiment of FIGS. 5 through 10. This embodiment illustrates how the shaft locking device 120 can be integrated with a linear bearing for a linear motion system. The same general descriptions given for the embodiments of FIGS. 1 through 4 and FIGS. 5 through 10 also apply to this embodiment of the shaft locking device 120, therefore similar parts have been given the same reference numbers, with the following modifications. As best seen in the longitudinal cross section of FIG. 13, the housing 124 of the shaft locking device 120 has been elongated to accommodate at least one linear bearing in alignment with the locking mechanism 122. In this illustrative embodiment, the locking mechanism 122 has been placed between two linear ball bearings 126, 128 of a twin pillow block. Other possible embodiments of the shaft locking device could have the locking mechanism 122 integrated with only one linear bearing or could have two or more locking mechanisms 122 integrated with one, two or more linear bearings. The locking mechanism of the shaft locking device can also be modified for use or integration with open bearings. Integrating the locking mechanism of the shaft locking device with one or more linear bearings allows the shaft locking device to be easily added to linear motion systems either at the design stage or as a retrofit to existing linear motion systems without additional components.

Figure 14:
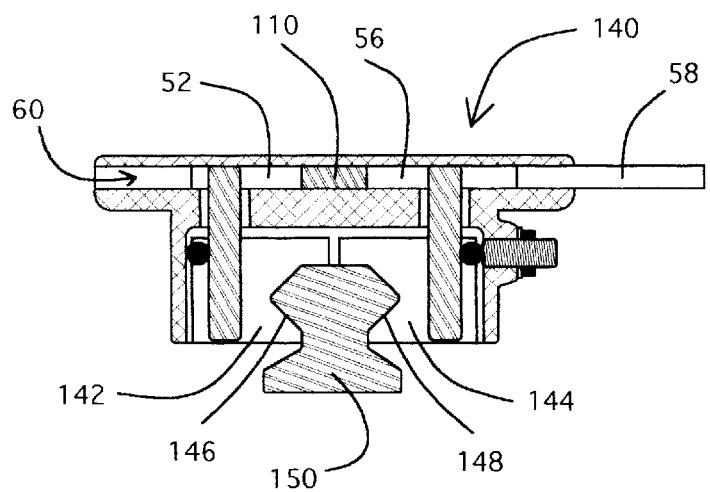
FIG. 14 shows a lateral cross section of a fourth embodiment of the invention adapted for use with a rail-type linear guidance system, and which is simplified by having fewer parts.

FIG. 14 shows a lateral cross section of a fourth embodiment of the invention adapted for use with a rail-type linear guidance system. Rail-type linear motion or linear guidance systems are gaining ground in linear motion applications where high precision and/or extreme rigidity are important. Rail-type linear motion systems are based around a rail which is specially configured to support moving platforms that ride on recirculating ball or roller-type bearings. The rail is usually supported along its entire length for rigidity. Currently available rail-type linear guidance systems include KUE systems which have two linear ball tracks, KUVE systems which have four linear ball tracks, KUSE systems which have six linear ball tracks, LF systems which have two tracks for roller bearings, and RUE systems which have four tracks for roller bearings.

FIG. 14 shows a shaft locking device 140 which has been adapted for operation with a RUE type rail 150 of a linear guidance system. The shaft locking device 140 is illustrated in an inverted orientation with the toggle mechanism 60 above the clamping members 142, 144 for proper engagement with the rail 150, which, in this illustrative example, is supported from below. The opposing faces of the clamping members 142, 144 have specially-contoured cut-outs 144, 146 which conform to the shape of the rail 150. For use with the RUE type rail 150 illustrated, the cut-outs 144, 146 are approximately V-shaped.

Other types of rails will require different configurations of the cut-outs 144, 146. As with the previously described embodiments, this embodiment of the shaft locking device 140 may be configured as a stand-alone component or it may be integrated with the recirculating ball bearings or roller bearings of the linear motion system.

This embodiment of the shaft locking device 140 has, further, been simplified by eliminating the guide strip of the previously described embodiments. Instead of using the guide strip, the housing 24 of the device is configured to maintain the alignment of the clamping members 142, 144 relative to the rail 150.

Optionally, the clamping members 142, 144 may be modified by radiusing the lower edges of the clamping members to maintain sufficient clearance above the first and second toggle links 52, 56 and the toggle disk 110 of the toggle mechanism 60.

Figure 15:
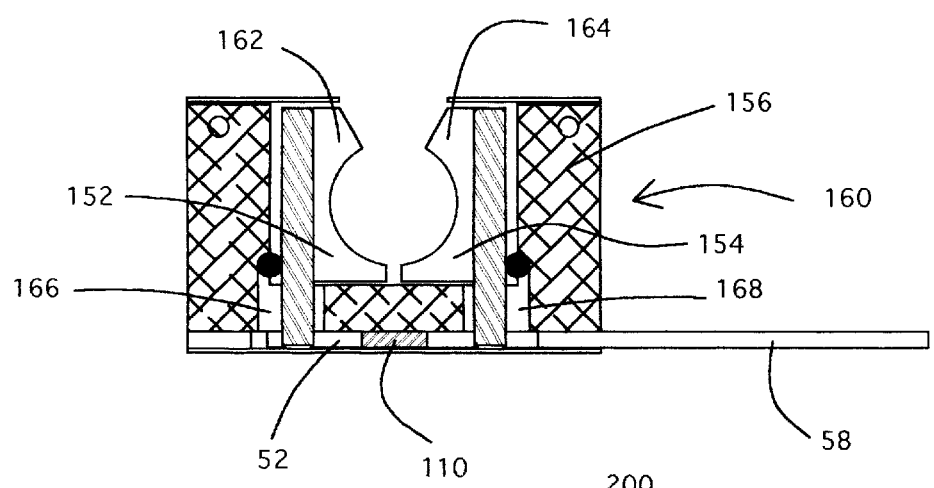
FIG. 15 shows a cross sectional view of a fifth embodiment of the device having an open face, and which is simplified by having fewer parts.

FIG. 15 illustrate a fifth embodiment of the shaft locking device 160 of the present invention which is a further modification of the embodiment of FIGS. 1 through 10. In this embodiment, the housing 156 has an open face on the side opposite the toggle mechanism 60 similar to that shown in FIG. 14 discussed above. This embodiment also does not use a guide strip. The same general descriptions given for the embodiments of FIGS. 1 through 10 also apply to this embodiment of the shaft locking device 160, therefore similar parts have been given the same reference numbers, with the following modifications.

In FIG. 15, the clamping members have a beveled portion 162, 164, but retain sufficient arch around the shaft to prevent a shaft from being removed from the device through the open portion on the bottom of the housing. In alternate embodiments, the housing can extending partially over the ends of the brake arms 162, 164. An advantage to the embodiment shown in FIG. 15 is that the pivot pins 30, 32 can be dropped in place through lever arm slots 166, 168.

Referring to FIGS. 16 through 19, several embodiments of the device are shown adapted for coupling to a linear bearing block without modifying the linear bearing.

The shaft locking device of FIG. 16 shows a modification of the device described in FIG. 15 which further includes an end plate 176, and a base plate, not shown, which connects between the shaft locking device 160 and end plate 176. End plate 176 and shaft locking device 160 are further connected by tie rods 172, one tie rod 172 on each side of the linear bearing. The dimensions of the base plate and end plate 176 are chosen to fit the bottom of the particular linear bearing onto which the shaft locking device 160 will be coupled. The end plate 176 and base plate may be formed from on or several pieces of material. The tie rods 172 extend between the shaft locking device 160 and the end plate 176. One end of each tie rod 172 is coupled to the base plate, and the other end is received within a tie rod aperture which extends through both walls of the housing. The tension on the tie rods 172 can be adjusted with screw 174.

The linear bearing lies with the bottom of the linear bearing resting against the base plate, and with one side of the bearing on either end of the shaft aperture against the shaft locking device 160, and the other adjacent to the end plate 176. By tightening the tie rods 172, the device is securely couple to the linear bearing without damaging, or otherwise directly modifying the linear bearing.

FIG. 17 shows an embodiment of the invention utilizing two shaft locking devices 160 installed around an existing linear bearing without invasively coupling to the bearing or otherwise directly modifying the bearing. In the embodiment shown in FIG. 17, a second shaft locking device is used instead of the end plate of FIG. 16.

In alternate embodiments, seen in FIGS. 18 and 19, closed housings such as those described in relation to the devices shown in FIGS. 1–10 may be used instead of the open housing configuration seen in FIGS. 16 and 17.

In further alternate embodiments of the invention shown in FIGS. 16 through 19, the shaft locking device or devices could be coupled directly to the linear bearing by screws or adhesives. In all cases, the housing can be made with the same or different dimensions and profile as the linear bearing for a linear motion system to which the invention is coupled to or around.

FIG. 20 shows the shaft locking device used in association with a pressure cylinder 190, such as pneumatic or hydraulic cylinder, to lock the piston rod 186 with respect to the cylinder housing 184. In an alternate embodiment, the device could also be used with a linear electric motor. In more detail, FIG. 20 shows a perspective view of the shaft locking device 180 mounted on a hydraulic cylinder without modifying the cylinder. In the embodiment shown, the device includes a housing 182. The housing 182 is shown formed in a cylinder, however, any desired housing shape could be used.

The housing 182 includes chamber formed therein for receiving the shaft locking device components which are arranges as described in previous embodiments, but with the clamping members engaging the pressure ram instead of a shaft or rail of a linear motion system.

Figure 21:
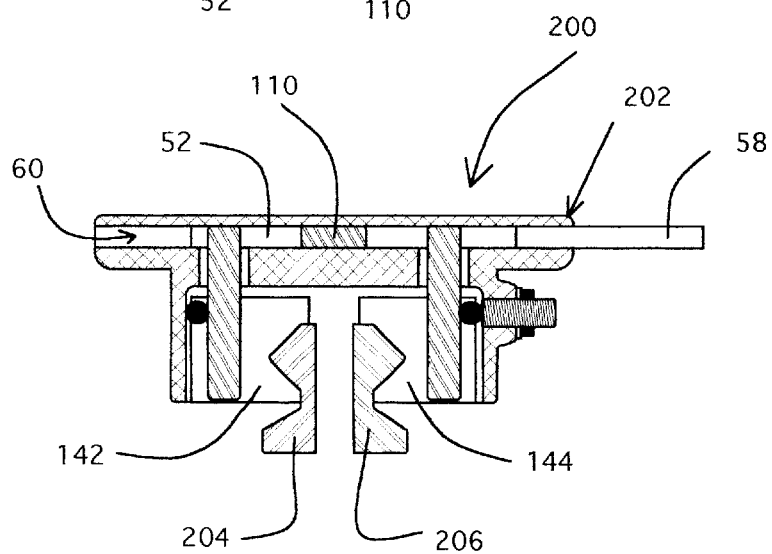
FIG. 21 shows a cross sectional view of the invention adapted for use on a plurality of shafts or rails.

FIG. 21 shows a shaft locking device similar to the device disclosed in FIG. 14, but adapted for use on two or more parallel rails. The same general description given for the embodiment of FIG. 14 also applies to this embodiment of the shaft locking device 200, therefore, similar parts have been given the same reference numbers, with the following modifications. Housing 202 contains clamping members 142 and 144 which each engage a different rail 204, 206 rather than a single rail. In alternate embodiments, rails 204 and 206 could be spaced further apart.

Other modifications of the shaft locking device of the present invention are also contemplated. For example, the clamping members of the device can be modified to work with a square shaft, a splined shaft or other shaft geometries. Although the embodiments shown and described herein are designed for manual actuation, they can easily be modified for pneumatic, hydraulic or electric actuation. The mechanical advantage of the toggle mechanism allows the use of a smaller electric solenoid or pneumatic or hydraulic cylinder or a lower actuation pressure for actuating the shaft locking device. Force measurements have shown at least a 15 to 1 ratio between the force required to activate the braking assembly, and the force applied by the braking assembly on the shaft or rail. However, variation in placement of the pivot pins 30 and 32 or other adjustments to components of the device can be used to increase or decrease the ratio.

In addition, using an over center toggle mechanism makes the shaft locking device self-locking so that it will remain locked even if there is a loss of electric, pneumatic or hydraulic power to the system.

The preferred embodiments described herein are illustrative only, and although the examples given include many specificities, they are intended as illustrative of only a few possible embodiment of the invention. Other embodiments and modifications will, no doubt, occur to those skilled in the art. Thus, the examples given should only be interpreted as illustrations of some of the preferred embodiments of the invention, and the fill scope of the invention should be determined by the appended claims and their legal equivalents.

What is claimed is:

1. A device used for locking or braking on a linear motion system having at least one shaft or rail which moves axially relative to said device, said device comprising:

a housing having a chamber defined by, a first side, a second side, a third side, and a fourth side, said first and third sides having shaft apertures opposite one another to receive the at least one shaft or rail passing therethrough, a pair of clamping members being received in said chamber of said housing, said clamping members having a first side and a second side, said first side of each clamping member having a cut-out portion, each said clamping member being positioned with said cut-out portions facing each other and substantially aligned with each other, said cut-out portions formed to receive the at least one shaft or rail of the linear motion system, said clamping members further being movable between a first position and a second position, wherein said clamping members are frictionally engaged with the shaft or rail of the linear motion system in said first position and wherein the at least one shaft or rail is loosely slideable between said clamping members when said clamping members are in said second position, said first clamping member further comprising a first lever arm, said second clamping member further comprising a second lever arm, a first pivot body acting as a fulcrum positioned between said first clamping member and said first wall of said housing, a second pivot body acting as a fulcrum positioned between said second clamping member and said second wall of said housing, said first and second pivot bodies being distinct from the housing, and an actuation assembly acting on said first and said second lever arms for selectively rotating said first and second clamping members between said first and second positions around said first and second pivot bodies, whereby, when said actuation assembly is actuated, said clamping members pivot to said first position around their respective pivot bodies causing said clamping members to frictionally engage the at least one shaft or rail.

2. The device of claim 1, wherein said pivot bodies are positioned on said second side of each said first and second clamping member at a point between a centerline of said cut-out portions of said clamping member and said lever arm of said clamping members, said position being selected to provide a desired clamping pressure.

3. The device of claim 1, wherein said second side of said housing further comprises at least one threaded adjustment aperture, said at least one threaded adjustment aperture receiving a means for adjusting a distance between said second side of said housing and said second side of said first clamping member.

4. The device of claim 1, wherein said fourth side of said housing further comprises at least one threaded adjustment aperture, said at least one threaded adjustment aperture receiving a means for adjusting a distance between said fourth side of said housing and said second side of said second clamping member.

5. The device of claim 4, wherein said first side of said housing further comprises at least one threaded adjustment aperture, said at least one threaded adjustment aperture receiving a means for adjusting a distance between said first side of said housing and said second side of said first clamping member.

6. The device of claim 1, wherein said clamping members are formed from at least one of the following materials: aluminum, porous bronze, brake lining material, fiberglass loaded epoxy, Delrin Acetal, and metal reinforced asbestos.

7. The device of claim 1, wherein said clamping members further comprise a lining material inside said cut-out portions.

8. The device of claim 7, wherein said lining material is chosen from at least one of the following materials: aluminum, porous bronze, brake lining material, fiberglass loaded epoxy, Delrin Acetal, and metal reinforced asbestos.

9. The device of claim 1, wherein the device is coupled to a linear bearing.

10. The device of claim 1, wherein said device is coupled to a linear bearing without modifying said linear bearing.

11. The device of claim 1, wherein said device is coupled to a pedestal which moves on the at least one shaft or rail of the linear motion system.

12. The device of claim 1, wherein a plurality of said devices are used on the linear motion system.

13. The device of claim 1, wherein two said devices are used on the linear motion system.

14. The device of claim 13, further comprising an actuator which acts on said actuation assemblies of said devices for simultaneously actuating said devices on the linear motion system.

15. The device of claim 1, wherein said device is coupled to a pressure cylinder.

16. A device used for locking or braking on a linear motion system having at least one shaft or rail which moves axially relative to said device, said device comprising.

a housing having the at least one shaft or rail of the linear motion system extending therethrough, a pair of clamping members positioned within said housing, said clamping members being positioned on opposite sides of the at least one shaft or rail, each of said clamping members being adjustable between a first position and a second position, said clamping members being frictionally engaged with the at least one shaft or rail of he linear motion system in said first position and the at least one shaft or rail is loosely slideable between said clamping members when said clamping members are in said second position, said first clamping member further comprising a first lever arm and said second clamping member further comprising a second lever arm, an actuation mechanism comprising a first toggle arm having a first end and a second end, said first end of said first toggle arm including a pivot point, said first toggle arm pivotally engaging said first lever arm at said pivot point on said first toggle arm, said actuation mechanism further including a second toggle arm said second toggle arm including a first end, a second end, and a pivot point between said first and second ends, said first end of said second toggle arm including a handle, said second toggle arm pivotally engaging said second lever arm at said pivot point on said second toggle arm between said first and said second ends, and a pivot engaged between said second end of said first toggle arm and said second end of said second toggle arm, whereby rotating the handle end of the second toggle arm will cause said first and second toggle arms to rotate at said pivot, moving said lever arms, thereby causing said clamping members to rotate around said first and second pivot points between said first and second positions, thereby causing said clamping members to frictionally engage the at least one shaft or rail of the linear motion system.

17. The device of claim 16, wherein said second end of said first toggle arm has a concave recess, said second end of said second toggle arm has a concave recess and said pivot is a toggle disk pivotally engaged between said concave recess of said first toggle arm and said concave recess of said second toggle arm, whereby rotating the handle end of the second toggle arm will cause said first and second toggle arms to rotate around said toggle disk, moving said lever arms, thereby causing said clamping members to rotate around said pivot points between said first and second positions, thereby causing said clamping members to frictionally engage the at least one shaft or rail of the linear motion system.

18. The device of claim 16, wherein said second end of said first toggle arm has a concave recess, said second end of said second toggle arm has a concave recess, and said pivot is a flexible toggle ring pivotally engaged between said concave recess of said first toggle arm and said concave recess of said second toggle arm.

19. The device of claim 16, wherein the device is coupled to a linear bearing.

20. The device of claim 16, wherein said device is coupled to a linear bearing without modifying said linear bearing.

21. The device of claim 16 wherein said device is coupled to a pedestal which moves on the at least one shaft or rail of the linear motion system.

22. The device of claim 16, wherein a plurality of said devices are used on the linear motion system.

23. The device of claim 16, wherein two said devices are used on the linear motion system.

24. The device of claim 23, further comprising an actuator which acts on said actuation mechanisms of said devices for simultaneously actuating said devices on the linear motion system.

25. The device of claim 16, wherein said housing farther comprises a chamber defined by a first side, a second side, a third side, and a fourth side, said first and third sides having shaft apertures opposite one another to receive the at least one shaft or rail passing therethrough.

26. The device of claim 25, wherein said clamping members are received in said chamber of said housing, said clamping members having a first side and a second side, said first side of each clamping member having a cut-out portion, each said clamping member being positioned with said cut-out portions facing each other and substantially aligned with each other, said cut-out portions formed to receive the at least one shaft or rail of the linear motion system.

27. The device of claim 16, wherein said clamping members are movable between a first position and a second position, wherein said clamping members are frictionally engaged with the at least one shaft or rail of the linear motion system in said first position and wherein the at least one shaft or rail is loosely slideable between said clamping members when said clamping members are in said second position.

28. The device of claim 16, further comprising a first pivot body acting as a fulcrum positioned between said first clamping member and a second wall of said housing, a second pivot body acting as a fulcrum positioned between said second clamping member and a fourth wall of said housing.

29. The device of claim 16, wherein said clamping members are formed from at least one of the following materials: aluminum, porous bronze, brake lining material, fiberglass loaded epoxy, Dehrin Acetal, and metal reinforced asbestos.

30. The device of claim 16, wherein said clamping members further comprise a lining material inside said cut-out portions.

31. The device of claim 30, wherein said lining material is chosen from at least one of the following materials: aluminum, porous bronze, brake lining material, fiberglass loaded epoxy, Delrin Acetal, and metal reinforced asbestos.

32. The device of claim 20, wherein said device is coupled to a pressure cylinder.

33. A device used for locking or braking on a linear motion system having at least one shaft or rail which moves axially relative to said device, said device comprising:

a housing having chamber defined by, a first side, a second side, a third side, and a fourth side, said first and third sides having bore holes opposite one another to receive the at least one shaft or rail passing therethrough, a pair of clamping members being received in said chamber of said housing, said clamping members having a first side and a second side, said first side of each clamping member having a cut-out portion, each said clamping member being positioned with said cut-out portions facing each other and substantially aligned with each other, said cut-out portions formed to receive the at least one shaft or rail of the linear motion system, said clamping members further having a first position and a second position, each said clamping member being adjustable in a first direction to said first position so as to be frictionally engaged with the at least one shaft or rail of the linear motion system, said clamping members being adjustable to a second position in a direction opposite said first direction wherein the at least one shaft or rail is loosely slideable between said clamping members, a first pivot body acting as a fulcrum positioned between said first clamping member and said first wall of said housing, a second pivot body acting as a fulcrum positioned between said second clamping member and said second wall of said housing, an actuation assembly for selectively rotating said first and second clamping members between said first and second positions around said first and second pivot bodies, said actuation assembly comprising a first toggle arm having a first end and a pivot point pivotally engaging said first lever arm, said first end of said first toggle arm including a concave recess, said actuation assembly further including a second toggle arm said second toggle arm including a first end, a second end, and a pivot point between said first and second end, said first end of said second toggle arm having a concave recess, said second toggle arm pivotally engaging said second lever arm at said pivot point on said second toggle arm, and a toggle disk pivotally engaged between said concave recess of said first toggle arm and said concave recess of said second toggle arm, whereby rotating said second end of said second toggle arm will cause said first and second toggle arms to rotate around said toggle disk, causing said lever arms to move between said first and second positions, thereby causing said clamping members to rotate around said pivot bodies, thereby causing said clamping embers to frictionally contact the at least one shaft or rail of the linear motion system.

\* \* \* \* \*